Patented Oct. 19, 1943

2,332,265

UNITED STATES PATENT OFFICE 2,332,265

ADHESIVE SHEETING

Richard F. Schmidt, Cuyahoga Falls, Ohio, assignor to The B. F. Goodrich Company, New York, N. Y., a corporation of New York No Drawing. Application June 27, 1941, Serial No. 400,145

5 Claims. (Cl. 117—122)

This invention relates to flexible sheeting coated with a pressure-sensitive adhesive and pertains specifically to a transparent tape made from plasticized gamma polyvinyl chloride coated with an adhesive composition comprising polyisobutylene, rubber, and a resinous material.

Pressure-sensitive adhesive tapes with paper or fabric backings have long been known, but it has been hitherto impossible to find an adhesive which is satisfactory for use with a plasticized gamma-polyvinyl chloride backing. There are many advantages to be gained by using polyvinyl chloride, or a polymer in which vinyl chloride is the principal constituent such as a copolymer of vinyl chloride with minor proportions of vinyl cyanide, vinyl acetate or other vinyl ester, vinylidene chloride, or the like. A backing made of one or more of these materials is, without further treatment, waterproof, non-inflammable, resistant to oils and solvents commonly used in paint or lacquer, and extremely resistant to aging by sunlight or air. Moreover, tape made from this material may be produced in a variety of colors, and may be transparent, translucent, or opaque. Because of the high tensile strength of plasticized gamma polyvinyl chloride the film used as backing may be extremely thin without danger of having the tape tear when being removed from a surface to which it has been applied.

I have found that pressure-sensitive adhesives which give satisfactory results with paper or fabric backings are not effective with backings made from plasticized gamma-polyvinyl chloride. Ordinary adhesives either do not adhere well to the polyvinyl chloride backing, or, if they do adhere, they tend to off-set; that is, when the tape is rolled up on itself the adhesive layer tends to stick to the back of the tape below it rather than remain fixed to the face of the tape. Moreover, if the tape made with this adhesive remains rolled up on itself for a few days it develops wrinkles which extend through the backing and destroy the desired appearance.

I have now discovered that a satisfactory pressure-sensitive adhesive tape can be made by combining a backing of plasticized gamma-polyvinyl chloride or other polymer in which the principal constituent is vinyl chloride with an adhesive comprising rubber, a resinous material, and polyisobutylene.

The backing sheet may be made by any of the usual methods—e. g., extrusion, molding, calendering, or by rotating a heated cylinder partly immersed in a solution of the desired polymer and plasticized in a volatile solvent, and stripping the resultant film from the cylinder as it rotates. The thickness of the backing sheet may vary over a wide range, depending upon the particular use to which the tape or sheeting is to be put. In general, thicknesses of .001 to .004 inch or more are satisfactory. Any of the usual plasticizers may be used with the polymer, but more than about 20% by weight of the plasticizer, based on the weight of the polymer, produces a sheet which is too soft to be useful. Plasticizers such as tricresyl phosphate, dibutyl phthalate, dioctyl phthalate, tributyl aconitate, butyl phthalyl butyl glycollate and the like all give satisfactory sheets. Any of the pigments or dyes commonly used in the rubber or plastics industries may be incorporated in the backing composition to provide a variety of effects. In order to increase the stability of the polymeric composition toward sunlight and ultraviolet light it may be desirable to add small amounts of stabilizers such as calcium stearate, calcium silicate, lead silicate, partial esters of polyhydric alcohol and unsaturated fatty acids, triethanolamine, and the like.

Although the rubber, polyisobutylene, and resinous material of the adhesive layer are all essential ingredients, their relative proportions may vary over a fairly wide range. In general, about 50 to 75% by weight of milled rubber, 15 to 30% of polyisobutylene, and 5 to 15% of resinous material are desirable. The rubber should be well milled or plasticated before using, and may be either natural or a synthetic such as a copolymer of butadiene with another copolymerizable monomer. The polyisobutylene should preferably be a material with a moderately long chain-length, although other materials are also satisfactory. Such compounds as the oily material sold as Vistac or the rubbery material sold as Vistanex are suitable. The resinous material is preferably an ester gum, although other materials such as melted rubber, rosin, or the like may be used. It is usually preferable to apply this adhesive to the backing in the form of a solution in a volatile solvent such as gasoline, hexane, benzene, or mixtures of these materials with each other or with other hydrocarbon liquids. The solution may be applied by spreading, spraying, or any other suitable method.

As a specific example of my invention I have prepared a backing containing 100 parts of gamma polyvinyl chloride, 5 parts of dioctyl phthalate, and 2 parts of the monoester of glycerine and cottonseed fatty acid. A polished metal drum heated to a temperature of about 150° C. is rotated through a 10% solution of this composition in cyclohexanone. The transparent film produced is about .002 inch thick and is stripped from the drum before the completion of its revolution. This film is then coated on one side by means of a spreading machine with a solution of 20 parts of milled rubber, 7 parts of the rubbery polyisobutylene sold as Vistanex and 3 parts of ester gum in 10 parts of benzene and 80 parts of gasoline. After drying at a temperature between 30° and 50° C. or more the product may be rolled up on itself and cut to tapes of the desired width.

Tape such as this has not only the desirable feature of transparency and glossy surface, but also is extremely resistant to deterioration from light, heat, oils, solvents, and many corrosive chemicals.

I claim:

1. A pressure-sensitive adhesive sheet comprising a backing consisting substantially of a plasticized polymer in which the principal constituent is vinyl chloride, and an adhesive layer consisting of rubber, polyisobutylene, and a member of the class consisting of melted rubber, rosin, and ester gum.

2. A pressure-sensitive adhesive sheet comprising a backing consisting substantially of a plasticized polymer in which the principal constituent is vinyl chloride, and an adhesive layer consisting of rubber, ester gum, and polyisobutylene.

3. A pressure-sensitive adhesive sheet comprising a backing consisting substantially of plasticized gamma-polyvinyl chloride and an adhesive layer consisting of rubber, ester gum, and polyisobutylene.

4. A pressure-sensitive adhesive sheet comprising a backing consisting substantially of plasticized gamma-polyvinyl chloride and an adhesive layer consisting of rubber, polyisobutylene, and a member of the class consisting of melted rubber, rosin, and ester gum.

5. A transparent pressure-sensitive adhesive sheet comprising a backing consisting substantially of plasticized gamma-polyvinyl chloride and an adhesive layer consisting of 20 parts of milled rubber, 7 parts of polyisobutylene, and 3 parts of ester gum.

RICHARD F. SCHMIDT.